Feb. 16, 1960
M. SIGMUND
2,925,041
PUMP AND DRIVING MOTOR UNIT
Filed Jan. 23, 1956
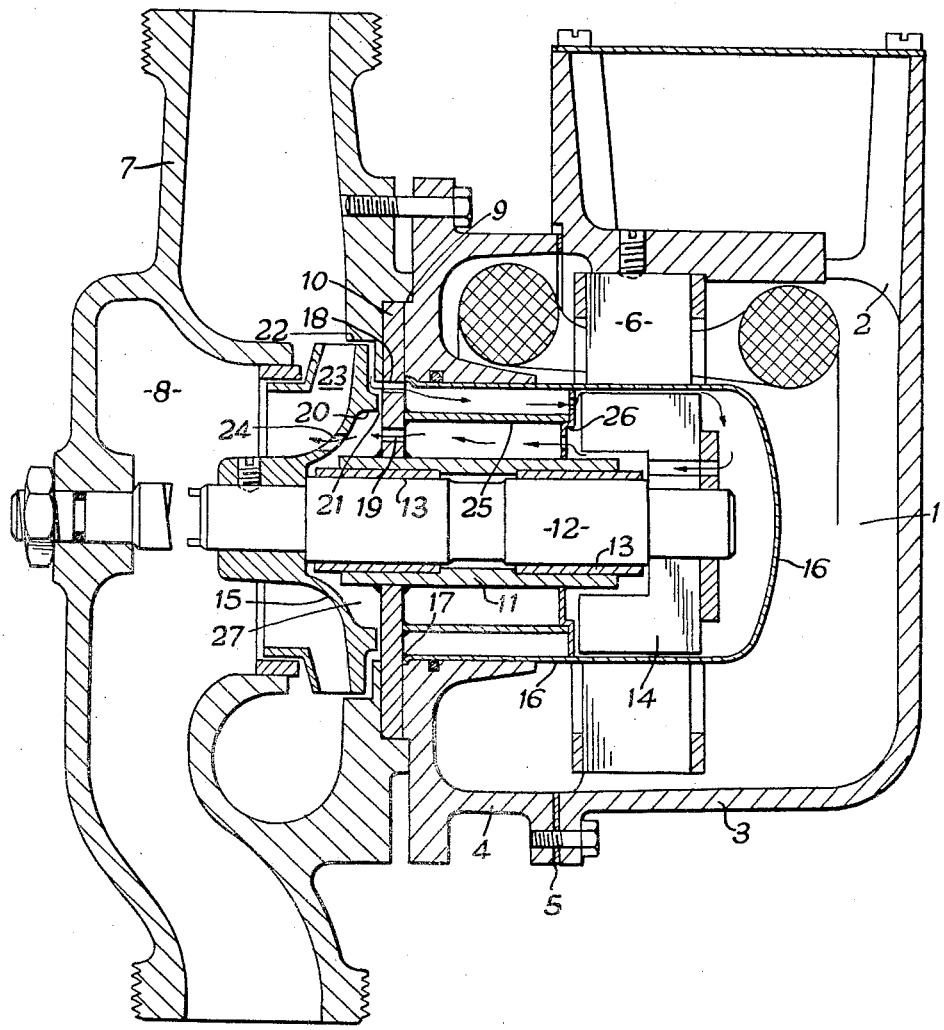
INVENTOR
Miroslav Sigmund
BY
Ralph B. Stewart
ATTORNEY

United States Patent Office 2,925,041
Patented Feb. 16, 1960

2,925,041

PUMP AND DRIVING MOTOR UNIT

Miroslav Sigmund, Newcastle-upon-Tyne, England

Application January 23, 1956, Serial No. 560,797

Claims priority, application Great Britain January 28, 1955

5 Claims. (Cl. 103—87)

The present invention relates to an improved unit or assembly comprising a rotary pump for water or other liquid and an electric motor for driving said pump through a shaft common to the motor and the pump.

Units as described above are known in which the rotor of the driving motor is separated from the stator by a casing or shell forming an overhung or lateral extension of the body of the pump and the interior of which shell is in communication with the interior of the pump body so that while liquid from the pump may have access to the interior of the shell and the rotating parts of the motor of the unit, access of water to the stator of the motor is prevented.

Such pump and driving motor units are commonly used for example in hot-water space-heating equipment for effecting or assisting the circulation of the water but they are also well adapted for use in fulfilling other industrial purposes.

The present invention is directed to an improved form of pump and driving unit of this kind.

In accordance with the invention a pump and driving motor unit is provided comprising an outer casing containing the driving motor, a pump body in sealed connection with one end of said outer casing, a support mounted fixedly at or in the region of the junction between said outer casing and said pump body and supporting a fixed shell enclosing the rotor of the motor in a manner separating said rotor from the stator and a fixed sleeve extending into said shell and forming a bearing for the shaft of the motor and the pump impeller, the arrangement being such that while liquid may have access from the pump to the interior of the shell, access of liquid to the stator of the motor is prevented.

In some cases flow and return passages may be provided through the support and so disposed with reference to the shell and the impeller of the pump as to provide some degree of forced circulation of liquid between the pump and the interior of the shell.

The connection between the outer casing of the motor and the pump body may be a spigot and socket connection and in such case the support may be an annular plate clamped between the parts of the spigot and socket joint, the bearing sleeve being sealed in the aperture in the annular plate so as to extend axially thereof, and the shell being a metal hood co-axial with and surrounding the bearing sleeve and welded or otherwise fixed to one side of the support. Separate bearing bushes for the shaft may be mounted in the bearing sleeve fixed in the support.

To provide forced circulation of liquid within the motor apertures are formed through the support at points inside the edge of the axially extending shell permitting water or other liquid being pumped, to pass from the discharge end of the pump to the interior of the shell and further apertures are formed through the support at further points nearer to the bearing sleeve for the return of that water to a suction point of the pump.

The invention is illustrated by way of example in the accompanying drawing which shows a view in sectional side elevation of a complete unit embodying an electric motor and a centrifugal pump.

Referring to the drawing the electric motor 1 comprises an outer casing 2 of general cylindrical form and consisting of two parts 3 and 4 jointed on a diametrical line as shown at 5, the outer end part 3 supporting stator elements 6 of the motor 1 on its interior in conventional manner.

To the other end of the motor casing 2 is connected the casing 7 of a centrifugal pump 8 by a spigot and socket joint as shown at 9.

Between adjacent faces of the part 4 of the motor casing and the casing 7 of the pump 8 is clamped an annular plate 10 constituting the above-mentioned support, the assembly being such as to provide liquid-tight junctions between parts 4, 7 and 10.

In the central aperture of the annular plate 10 is sealed a bearing sleeve 11 so as to extend axially thereof and the sleeve 11 in the case illustrated extends at both sides of the plate 10.

A shaft 12 is mounted for rotation in the bearing sleeve 11 preferably in bearing bushes 13 as in the case illustrated, the rotor 14 of the motor 1 being fixedly mounted on one end of the shaft 12 and the impeller 15 of the pump 8 on the other end of said shaft.

A hollow metal element 16 of cylindrical form closed at one end and disposed co-axial with and surrounding the shaft 12, is welded or otherwise fixed at its open end, with a continuous joint as shown at 17 to the face of the plate 10. The element 16 constitutes the above referred to shell and it is of a diameter to extend through the gap between the stator 6 and the rotor 14 of the motor 1 and with a small clearance between the interior of the shell 16 and the rotor 14.

The pump impeller 15 may make face engagement with the outer surface of the plate 10.

With an arrangement as described above liquid being pumped may pass between the pump impeller 15 and the plate 10 and thence to the bearings of the shaft 12 in the bearing sleeve 11 to provide lubrication, and to the interior of the shell 16 but access of liquid to the stator 6 is wholly prevented by the shell 16.

When necessary, in order to provide copious bathing of the shaft bearings and a more adequate cooling of the motor, means may be provided to effect some degree of forced circulation of liquid in the shell 16.

In such case one or a distributed series of apertures 18 are formed through the support 10 inside but close to the edge of the shell 16 connected thereto and a further aperture or distributed series of apertures 19 formed through the support 10 but nearer to the bearing sleeve 11 than the aperture 18. The impeller 15 of the pump 8 is formed with an annular projection 20 of small depth capable of forming a pressure reducing gap 21 with the adjacent surface of support 10 on a ring zone between the apertures 18 and 19 in the support 10, and the pump casing 7 is formed with a shoulder 22 in a position partly shrouding with small clearance the outlet 23 from the impeller 15 of the pump.

With this arrangement some of the pumped liquid is deflected by the shoulder 22 in the pump body into the gap between the impeller 15 and the support 10, some passing through the outer apertures 18 in the support 10 and into the shell 16 and some between the annular projection 20 on the impeller and the face of the support.

Further passages 24 are formed through the wall of the pump impeller 15 at the suction zone thereof, for the return passage of liquid emerging from the shell 16 through the inner apertures 19 and also for return of liquid which has passed between the annular projection 20 on the pump impeller and the face of the support 10.

The liquid pressure between the impeller 15 and the shoulder 22 in the pump body 7 and between the annular projection 20 on the impeller 15 and the face of the support 10 provide an hydraulic balance of forces on the shaft 12 created by the pumping action of the pump impeller 15 carried thereby and of electro magnetic forces.

A tubular baffle 25 may be provided to extend from between the apertures 18 and 19 in the support 10 inside the shell 16 and to within a short distance of the rotor 14 of the motor 1 to ensure effective bathing of the rotor. The tubular baffle 25 is fixed at one end to the support 10 and is supported at its free end by an apertured washer 26 bridging the annular space between the shell 16 and the bearing sleeve 11, an arrangement making for rigidity of those several parts as well as assisting in preventing the occurrence of air or vapour locks.

The impeller 15 of the pump is preferably recessed or made hollow at the side towards the support 10 as shown at 27, so that the end of the bearing sleeve 11 extending from the side of the support 10 remote from the motor 1 may extend into the impeller 15, thus enabling a bearing 13 of the shaft 12 to be located at or close to the centre of gravity of the rotating mass.

I claim:

1. A pump and driving motor unit for liquids, comprising an outer casing, a driving motor comprising a stator and a rotor contained within said outer casing, a pump body in sealed connection with one end of said outer casing, a pump impeller within said pump casing, said pump impeller including one apertured wall at the side thereof towards the interior of said outer casing with the aperture in said wall located adjacent the axis of the impeller, a shaft supporting the rotor of said motor and said pump impeller, a support member forming a common wall between said outer casing and said pump body, an annular member concentric with the shaft projecting from the apertured wall of the impeller toward the common wall and radially outward of the aperture, to define with a part of the common wall an annular pressure reducing gap, at least two apertures formed through said support member, one located at a radial distance from the axis of the shaft greater than the radial distance of said pressure reducing gap therefrom to provide flow from the pump body to said outer casing and the other located at a radial distance from the axis of the shaft less than the radial distance of the said pressure-reducing gap from said axis to provide return flow from the said outer casing to and through the apertured wall of the impeller and to the pump body, a cup-like shell surrounding said shaft and being sealed at its open end to the said support member with said open end embracing the apertures in said support member, said shell separating said rotor from said stator, and a bearing sleeve fixed in said support member and extending axially from said support member into said shell and forming a bearing for said shaft.

2. A pump and driving motor unit as claimed in claim 1 wherein the support member is formed by an annular plate clamped between ends of the said outer casing and the said pump casing, and the said bearing sleeve is sealed in the central opening of said annular plate and extends from a point adjacent the closed end of the cup-like axially extending shell and through the said support member and into the pump casing and providing the sole bearing support for the shaft.

3. A pump and driving unit for liquids, comprising an outer casing, a driving motor comprising a stator and a rotor contained within said outer casing, a pump body in sealed connection with one end of said outer casing, a pump impeller within said pump casing, a shaft supporting the rotor of said motor and said pump impeller, a support member forming a common wall between said outer casing and said pump body and having a plurality of apertures formed therein to provide connecting channels between said pump body and said motor casing, a cup-like shell surrounding said shaft and being sealed at its open end to the said support member with said open end embracing the apertures in said support member, said shell separating said rotor from said stator, a bearing sleeve fixed in said support member and extending axially from said support member into said shell and forming a bearing for said shaft, an axially extending annular projection between said pump impeller and the said interior support member forming a pressure-reducing gap located at a shorter radial distance from the axis of the said common shaft than at least some of the apertures in said interior support and a stationary circumferential surface surrounding said annular projection and partly shrouding the said pump impeller to direct pumped liquid through the support into the said shell.

4. A pump and driving motor unit for liquids comprising an outer casing, a driving motor comprising a stator and a rotor contained within said outer casing, a pump body in sealed connection with one end of said outer casing, a pump impeller within said pump casing, a shaft supporting the rotor of said motor and said pump impeller, a support member forming a common wall between said outer casing and said pump and defining with a part of said pump impeller an annular pressure-reducing gap concentric with said shaft, two annular sets of apertures in the said support member, one set on the radially outer side and the other set on the radially inner side of said pressure-reducing gap providing flow and return between said pump body and said outer casing, a cup-like shell surrounding said shaft and sealed at its open end to the said support member with said open end closely embracing the said one annular set of apertures in said support member on the radially outer side of said pressure-reducing gap, said shell separating said rotor from said stator, a fixed annular baffle concentric within said cup-like shell and closely embracing the said other annular set of apertures in said support member on the radially inner side of said pressure-reducing gap, and a bearing sleeve fixed in said support member and extending axially from said support member through said baffle and into said shell and forming a bearing for said shaft.

5. A pump and driving motor unit for liquids, comprising an outer casing, a driving motor comprising a stator and a rotor contained within said outer casing, a pump body in sealed connection with one end of said outer casing, a centrifugal pump impeller within said casing, said centrifugal pump impeller including an apertured wall at the side thereof towards the interior of said outer casing with the aperture in said wall located adjacent the suction zone of the impeller, a shaft supporting the rotor of said motor and said centrifugal impeller, a support member forming a common wall between said outer casing and said pump body, an annular member concentric with the shaft projecting from the apertured wall of the impeller toward the common wall and radially outward of the aperture, to define with a part of the common wall an annular pressure reducing gap, at least two apertures formed through said support member, one located at a radial distance from the axis of the shaft greater than the radial distance of the said pressure-reducing gap therefrom to provide flow from the pump body to said outer casing and the other located at a radial distance from the axis of the shaft less than the radial distance of the said pressure-reducing gap from said axis to provide return flow from said outer casing to and through the apertured wall of the centrifugal impeller to the suction zone thereof and to the said pump body, a cup-like shell surrounding said shaft and being sealed at its open end to the said support member with said open end embracing the apertures in said support member, said shell separating said rotor from said stator, and a bearing sleeve fixed in said support member and extending axially from said support member into said shell and forming a bearing for said shaft.

References Cited in the file of this patent

UNITED STATES PATENTS

| | | |
|---|---|---|
| 2,120,914 | Vogel | June 14, 1938 |
| 2,603,161 | Lloyd | July 15, 1952 |
| 2,669,187 | Guyer | Feb. 16, 1954 |
| 2,687,695 | Blom et al. | Aug. 31, 1954 |

FOREIGN PATENTS

| | | |
|---|---|---|
| 289,479 | Switzerland | July 1, 1953 |
| 995,059 | France | Nov. 27, 1951 |
| 997,390 | France | Jan. 4, 1952 |